(12) United States Patent
Zuverink

(10) Patent No.: US 7,984,386 B1
(45) Date of Patent: Jul. 19, 2011

(54) PRINT PAGE USER INTERFACE

(75) Inventor: David Zuverink, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1076 days.

(21) Appl. No.: 11/445,728

(22) Filed: Jun. 1, 2006

(51) Int. Cl.
*G06F 3/048* (2006.01)
*G06K 15/02* (2006.01)

(52) U.S. Cl. ........ 715/800; 715/251; 715/768; 715/767; 715/802; 358/1.2; 358/453

(58) Field of Classification Search .................. 358/1.2, 358/1.5, 1.11–1.18; 715/767, 802, 768
See application file for complete search history.

(56) References Cited

U.S. PATENT DOCUMENTS

| | | | | |
|---|---|---|---|---|
| 6,097,853 | A * | 8/2000 | Gu et al. | 382/282 |
| 6,825,860 | B1 * | 11/2004 | Hu et al. | 715/801 |
| 7,046,254 | B2 * | 5/2006 | Brown et al. | 345/592 |
| 2005/0111029 | A1 * | 5/2005 | Dehart | 358/1.15 |
| 2006/0256363 | A1 * | 11/2006 | Kayahara | 358/1.14 |
| 2007/0101257 | A1 * | 5/2007 | Lynn et al. | 715/516 |

OTHER PUBLICATIONS

Adobe Systems Inc., Output Guide for Print Service Providers, 2003.*
Microsoft, Microsoft Office Excel 2003, 2003.*
TechSmith, SNAGIT—Getting Started Guide, Mar. 2005, pp. 1-16.*
Printing http://www.gtisdell.cessnock-ict.net/Microstar/Intro%20to%20Excel%202003/Ch%207%20Printing.pdf (year 2003).*
New Features Workshop, <http://www.autodesk.com/us/interactiveoverviews/demo/autocad2007_nfw/index.html> (visited Sep. 5, 2006).
Adobe Acrobat 7.0 Printing Guide, white paper, 2005, San Jose, California, United States of America.
Get what you want printed on the page, <http://office.microsoft.com/training/training.aspx?AssetID=RP012318391033&CTT=6&Origin=RC012318411033> (visited Sep. 5, 2006).

* cited by examiner

*Primary Examiner* — Twyler L Haskins
*Assistant Examiner* — Huo Long Chen
(74) *Attorney, Agent, or Firm* — Robert C. Kowert; Meyertons, Hood, Kivlin, Kowert & Goetzel, P.C.

(57) ABSTRACT

Print page user interface is described, including receiving a request to open a printing interface, the printing interface being substantially transparent such that content positioned underneath the printing interface is visible, determining a print area, the print area comprising a portion of the content visible in a print zone, the print zone being an area of the printing interface used to identify the portion and to configure the portion to print on no more than one sheet of paper, and sending a request to print the print area on the no more than one sheet of paper.

20 Claims, 10 Drawing Sheets

PRINT PAGE USER INTERFACE

FIELD OF THE INVENTION

The present invention relates generally to software. More specifically, a print page user interface is described.

BACKGROUND OF THE INVENTION

Printing may involve a plurality of steps. For example, in order to see what a document will look like when printed, a user may have to print the document and view it. If the user is satisfied with the printout, the process is complete. However, if the user is not satisfied, the user goes back to the application, makes changes to the document and prints again. Some applications allow a user to view the print version in a "print preview" mode in which an application presents a view of a printed page as it is to be printed. If the user is satisfied with the presentation of the information, the user may print. However, if the user is not satisfied with the presentation, the user gets out of the "print preview" mode and returns to the document editing mode to make changes. These iterative processes may continue until the user is satisfied with the presentation of the information.

Often a user of a document of large page dimensions such as a large format drawing may desire to print one area of a page on letter-size paper. This may also involve a plurality of steps and dialog boxes. For example, the user positions the appropriate section in the document to the active window of an application. The user selects the "print" menu item to access the printing functions, selects print "current view", selects the "print" button, and views the printout. However, all the desired information may not be printed on the page or there may be large sections of the paper unused. The user goes back to the application in editing mode, repositions the document, perhaps modifies margins, text, or zoom level and reprints. To reprint, the user selects the "print" menu item again, selects print "current view" again, and selects the "print" button again. This process may continue until the user is satisfied. In another scenario the user performs a "marquee select". That is the user highlights the desired portion of the large page, to indicate their print selection ensuring all the desired information is included. However, this printout may not be what the user expected in terms of size of drawing, white space, or paper size. That is, the aspect ratio of the marquee select used to select the portion of drawing may not have matched the selected paper size, resulting in large areas of the paper remaining unused and/or the scale being unacceptable. The user returns to the application to try again. The user may return the application to indicate a different size selection box so that less white space is included in the printout. To reprint, the user may select the "view" menu item again, selects print "current view" again, and selects the "print" button again or perform another marquee select. In some embodiments, the user may create multiple prints of the same scale and paper size for multiple portions of the large drawing. These iterative processes may frustrate a user trying to obtain the desired information on a single sheet of paper.

Further, there seems to be a disconnect between the options available in a print dialog box and the options accessible by a printer's "properties" dialog box. For example, in many applications the paper size selection is located in the "page setup" features of the document or content. Therefore, if the user selects print and the printer's page size setting is not set to the desired size, the printout may not be the desired size. The user would have to access a second dialog box to change the page size. Having printing settings scattered in these various locations is neither efficient nor user friendly.

Thus, what is needed is a printing interface without the limitations of conventional techniques.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

In some embodiments, a method of printing may include receiving a receiving a request to open a printing interface, the printing interface being substantially transparent such that content positioned underneath the printing interface is visible, determining a print area, the print area comprising a portion of the content visible in a print zone, the print zone being an area of the printing interface used to identify the portion and to configure the portion to print on no more than one sheet of paper, and sending a request to print the print area on the no more than one sheet of paper. In some embodiments a system for print page user interface may include a user interface configured to be substantially transparent such that content positioned substantially under the user interface is visible, a content identifier configured to identify a portion of content that appears in a printing boundary to fit on no more than one sheet of paper, the printing boundary located in the user interface, a scaler configured to determine a magnification of the portion based on a paper size and a zoom level, and a print command generator configured to generate one or more printing instructions based on the magnification, and the portion.

Figure 1A:
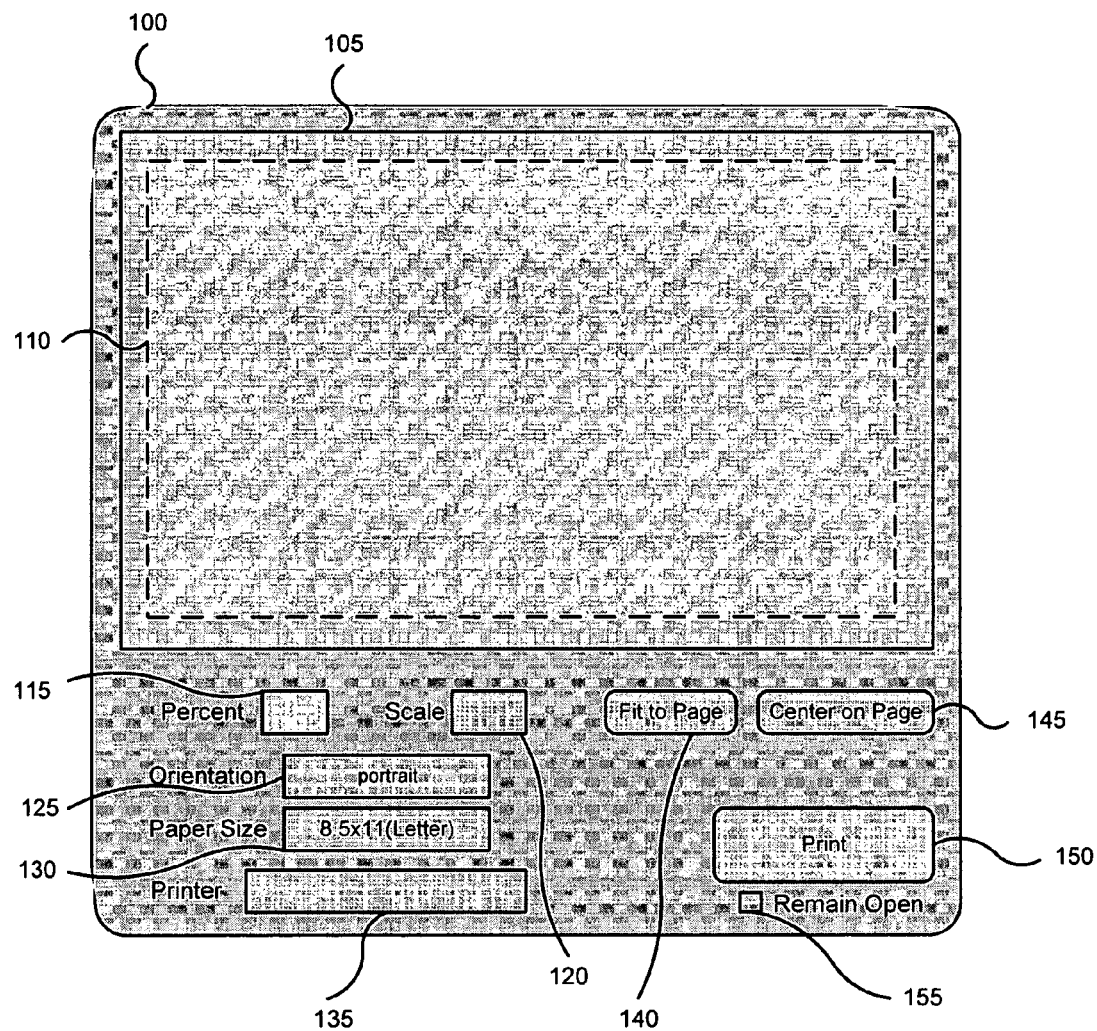
FIG. 1A illustrates an exemplary print page user interface.

FIG. 1A illustrates an exemplary print page user interface 100. In some embodiments, print page user interface 100 may include paper 105, print margins 110, percent magnification 115, scale 120, orientation 125, paper size 130, printer selection 135, and print button 150. In other embodiments, print page user interface 100 may further include fit to page button 140, center on page button 145, and remain open check box 155. Paper 105 may be an area of printing interface 100 that illustrates a piece of paper, the paper having printing margins 110. The printing margins 110 may include an area of the print page user interface 100 that may identify the printable area or imagable area of the paper and what portion of content may be printed. Printing margins 110 may be referred to as a content identifier, printing zone, page zone, printing region, window, printing area, printing border, printing boundary, printing box, printing lens, imagable area, or other like terminology. A printing zone or printing margins may be printer dependent. That is, the printer defaults and characteristics may affect the imagable area of paper. In some embodiments, printing margins 110 may indicate the portion of content that may fit on one sheet of paper. One sheet of paper may refer to a single, or no more than one, sheet of the size of paper selected for printing. In some embodiments, the user interface may determine the printing of more than one page. The multi-page user interface embodiment is described with reference to FIG. 2B.

As mentioned previously, the printing margins 110 may include an area of the printing interface that may identify the printable area of the paper and what portion of content may be printed. The size of the printing margins 110 may be altered. In some embodiments, changing the size of printing margins 110 may include changing the paper size selection 130. Paper size selection 130 may include legal, letter, 11×14, A0-A8, or other international and national standard sizes. For example, if the paper selection is currently changed from legal size to letter size, then less content may be printed on the page and printing margins 110 may be reduced. In some embodiments, changing the size of printing margins 110 may include changing the printer. Printers may have varying margin defaults and thus using different printers may result in different printing margins and different printouts. In some embodiment, printing margins 110 retains its aspect ratio even though it changes size. In some embodiments, the aspect ratio may be the ratio of height to width. In some embodiments, the aspect ratio may be the ratio of width to height. For example, if the printing interface 100 is reduced in size based on dragging one of its corners, then printing margins 110 may also reduce in size as illustrated in user interface 110. However, printing margins 110 may maintain the aspect ratio of the paper size.

Percent magnification 115 and Scale 120 are related to the zoom level of print margins 110. Percent 115 may be a magnification setting or zoom setting for the printing margins 110. That is, percent 115 may be used to change the zoom level or scale of the printouts that result from printing the content located in print margins 110. Zoom level may be referred to as a magnified view. That is, the zoom level may determine the quantity and size of the content as it is displayed. At a high zoom level the content may appear large and sparse in an application window or similar display area. At a low zoom level the content may appear small and dense in the application window or similar display area. Scale 120 may also be a magnification setting for printing margins 110. If a user sets percent magnification 115, scale 120 may be calculated and displayed to reflect the change in percent magnification 115. If a user sets scale 120, percent magnification 115 may be calculated and displayed to reflect the change. Percent magnification 115 and scale 120 may be related to paper size 130 and printing margins 110. That is, if a user selects a paper size and zooms out of the content to fit a larger amount or larger portion of content in printing margins 110, then the percent magnification 115 and scale 120 may be calculated at a lower value. If a user zooms in on the content to show a smaller portion of the content in an enlarged view, percent magnification 115 and scale 120 may be calculated at a higher value. Percent magnification 115 and scale 120 may be displayed to reflect the zoom and paper size settings. In some embodiments, changing the scale or percent may include changing the size of printing interface 100. Changing the size of printing interface 100 may include manipulating the user interface. For example, changing the size of printing interface 100 may include right-clicking a corner of printing interface 100 and dragging it with an input device such as a mouse, trackball, touchpad, or the like. By changing the interface more or less content may be visible in printing margins 110 causing the scale and percent to calculate to reflect the new zoom level.

Orientation 125 may include the arrangement of the content in a portrait or landscape manner. Orientation 125 may affect the shape of printing margins 110. That is, print margins 110 may alter its shape to be consistent with orientation 125. In some embodiments, printing margins 110 may maintain the aspect ratio that corresponds to orientation 125 through printing margins size and shape changes. That is, if printing interface 100 is sized using an input device, printing margins 110 may also be sized. However, printing margins 110 may retain its aspect ratio through the size change.

Printer selections 135 may include the options for output of the content. Printer selections may include a list of printers connected locally, and printers connect over a network. In some embodiments, printer selections include other output media such as a clipboard or cut and paste storage mechanism, a fax machine, a file or electronic document such as a text file, a portable document format (PDF) file, or other file formats. Independent of the printing selections, the printing instructions may include the information to print according to the selections made in print page user interface 100. For example, a portion of the content may be visible in printing margins 110 of print page user interface 100, paper size 120 and orientation 125 may be selected, scale 130 set, and the printer set to print to a PDF file. The printing instructions attached to the outputted PDF file are consistent with the settings of print page user interface 100. The outputted PDF file may be printed at a later time using the printing instructions created by print page user interface 100. The outputted PDF file may also be viewed or accessed by a PDF reader application.

"Fit to page" 140 may include magnifying the content visible in the print zone to consume the entire page of the paper size selected. That is, the content identified in printing margins 110 may not consume an entire page, "fit to page" 140 may magnify the content so that it is large enough to utilize all the space on the paper printout. For example, if the actual dimensions of a document at 100% zoom level are smaller than the dimensions of the paper, the space consumed on the paper will be small, i.e., there will be white space on the paper. Selecting fit to page 140 may allow the content to fill the printing margins 110 space on the paper. The percent magnification 115 and scale 120 may be calculated and display this change in magnification. "Center on page" 145 may allow a user to center the print zone in the center of the printout. For example, many printouts have printing that starts at the top left margin. "Center on page" 145 may allow the content or portion of content to be centered on the printout so that the center of the content may be aligned with the center of the paper printout.

"Remain open" 155 may be an option to allow the printing interface to remain open after a print function is completed. Many applications close a printing interface after a printing request has been fulfilled. However, when checked, "remain open" 145 does not close the printing interface after a print operation is complete. This may allow users to print many pages without having to open a printing interface for each desired printout. In some embodiments, the user interface may determine the printing of more than one page.

Figure 1B:
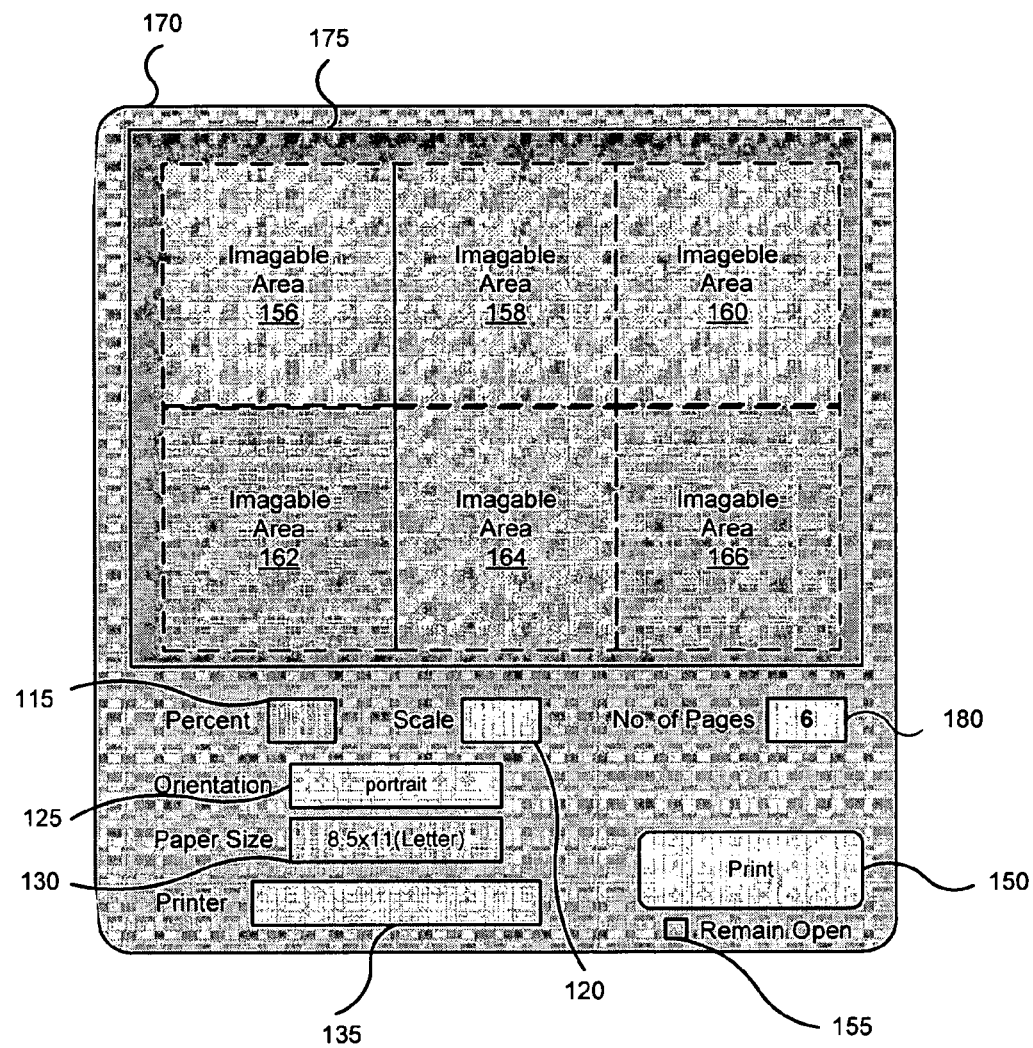
FIG. 1B illustrates an exemplary multi-page user interface.

FIG. 1B illustrates an exemplary multi-page user interface, 170. In some embodiments, a multi-page user interface 170 may include a paging area 175, a plurality of imagable areas or pages 156-166, a number of pages entry field 180, an orientation selection 125, paper size selection 130, printer selection 135, and a print button 150. Paging area 175 holds the imagable areas or pages. In some embodiments there may be only 1 imagable area. In other embodiments, there may be more than one imagable area. Here, six imagable areas or pages are shown including imagable area 156 through imagable area 166, which correspond to the quantity of 6 entered into number of pages entry field 180. Although 6 are shown here, any number can be selected. That is, if a quantity of 3 is entered into the number of pages entry field 180, then three imagable areas may be included in user interface 170. If a quantity of 8 is entered into the number of pages entry field 180, then eight imagable area may be included in user interface 170. The imagable area shown includes the print margins only. That is, the margins of each page are not shown in the user interface. In some embodiments, the pages printed out can be trimmed and connected together to form a larger drawing or image. User interface 170 elements percent 115, scale 120, orientation 125, paper size 130, printer selection 135 and printer button 150 function as described above in reference to FIG. 1A. In some embodiments, a multi-page user interface may include a remain open selection 155 which may determine to keep the user interfaced open after a print operation is complete.

Figure 2A:
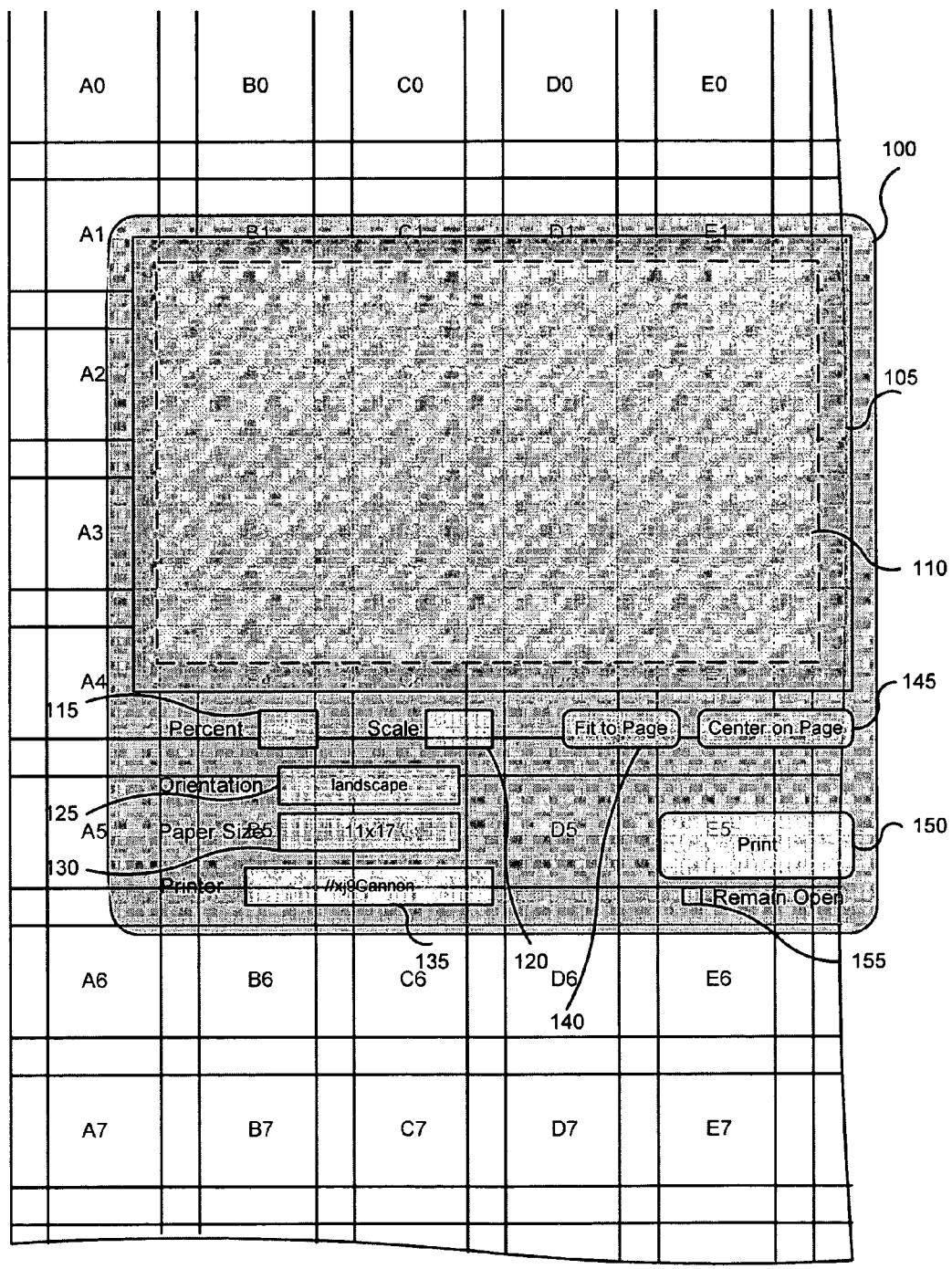
FIG. 2A illustrates the exemplary transparent print page user interface.

FIG. 2A illustrates an exemplary transparent print page user interface, 100. In some embodiments, print page user interface 100 may be transparent. That is, content positioned underneath print page user interface 100 may be visible. In other words, the content and print page user interface 100 positioned on top of the content may be seen simultaneously. Here, content sectors A1-A6, B1-B6, C1-C6, D1-D6, and E1-E6 can be seen underneath printing interface 100. By positioning print page user interface 100, the user can select a specific area of content to print. In other words, the printing interface may slide on, roll over, or hover above digital content. As the print page user interface is placed over different content portions or sectors, the area or portion of content that is visible in printing margins 110 may be identified for printing.

Figure 2B:
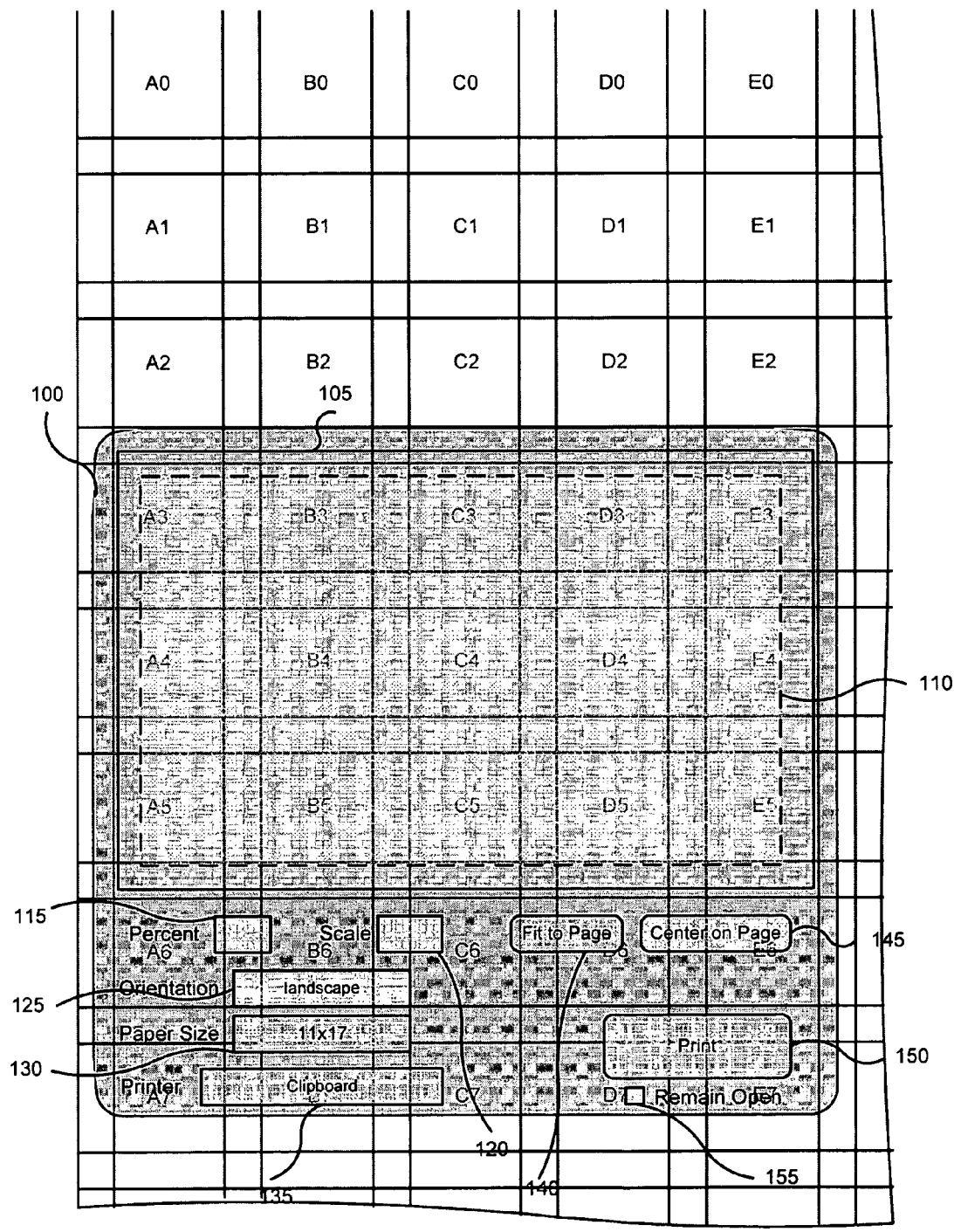
FIG. 2B illustrates the exemplary print page user interface repositioned to capture a different portion of the content.

FIG. 2B illustrates the exemplary print page user interface repositioned to capture a different portion of the content. In some embodiments, print page user interface 100 may be moved, repositioned, slide on, rolled over, or hovered above content to capture differing areas of content. Here, print zone 100 shows different sections of content, namely A3-A5, B3-B5, C3, C5, D3-D5, E3-E5. Print page user interface 100 may be positioned utilizing an input device such as a keyboard (shift+arrow keys), a mouse (drag and drop), a track ball, a touch pad, or similar devices. Print zone 100 may be sized more wide than it is long as the paper size is 11×17 and the orientation is landscape.

Figure 2C:
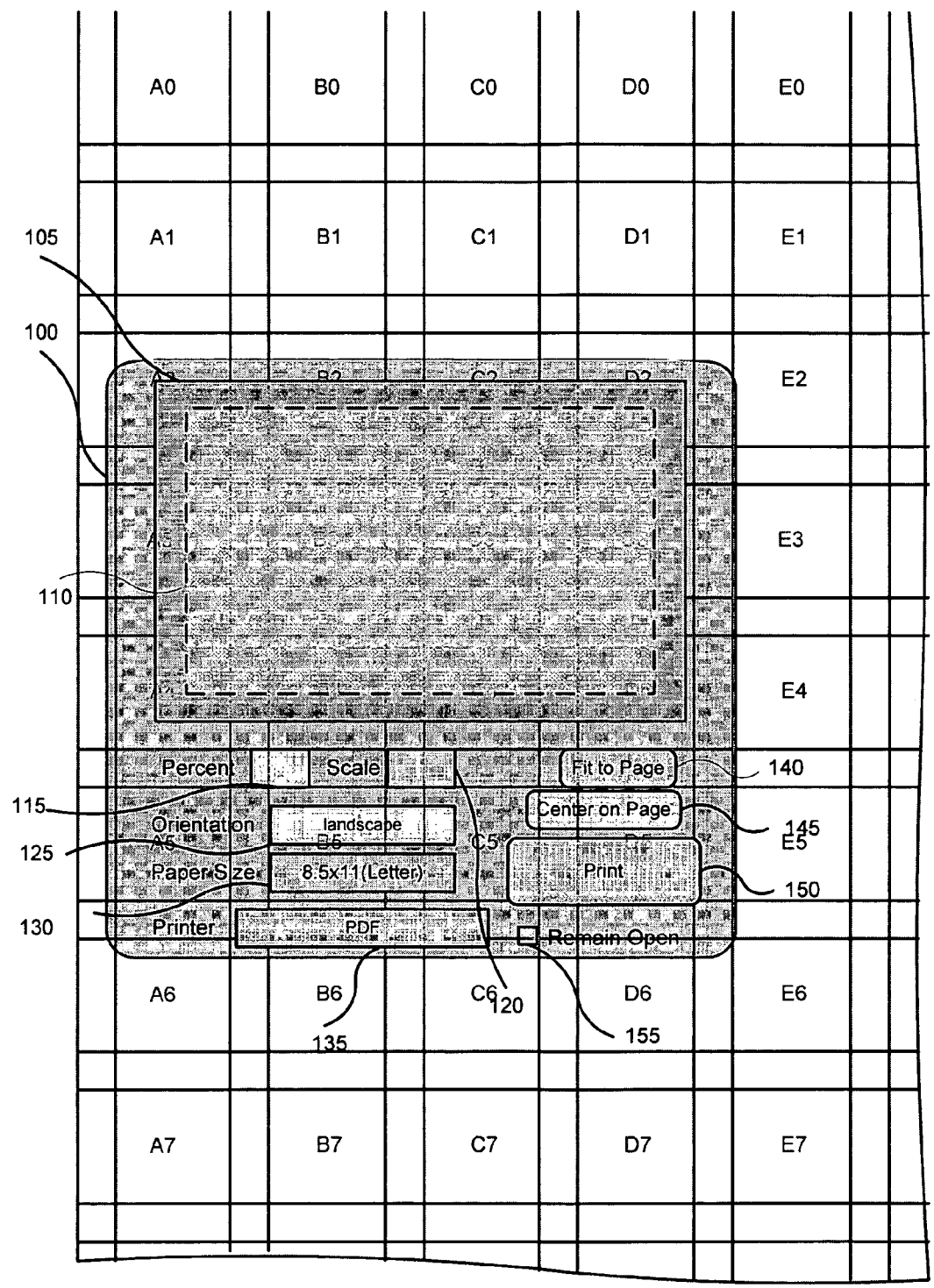
FIG. 2C illustrates the exemplary print page user interface with a letter size paper selected.

FIG. 2C illustrates the exemplary print page user interface with a letter size paper selected. In some embodiments, printing margins 110 may be reduced in size when paper size 130 is changed from 11×17 to letter size paper. Here, printing margins 110 has reduced in size such that less content is visible in printing margins 110. That is, as a smaller paper size is selected, a smaller portion of content can be printed and hence, printing margins 110 may be smaller. Here, printing margins 110 includes portions of sectors or sections of content A2-A4, B2-B4, C2-C4, D2-C4, and D2-D4. In some embodiments, the printing interface changes size with the change in size of print zone. Here, the printing interface size may be reduced with the reduction in size of printing margins 110. In some embodiments, the controls or buttons and information included in the printing interface (i.e., percent 115, scale 120, orientation 125, paper size 130, printer 135, fit to page 140, center on page 145, print button 150 and remain open 155) do not reduce in size upon a reduction in size of printing interface 100. In some embodiments, the controls and information may be repositioned upon a change in size of printing interface 100. Here, the controls and information are repositioned upon the change in size of printing interface 100 based on the change in paper size.

Figure 2D:
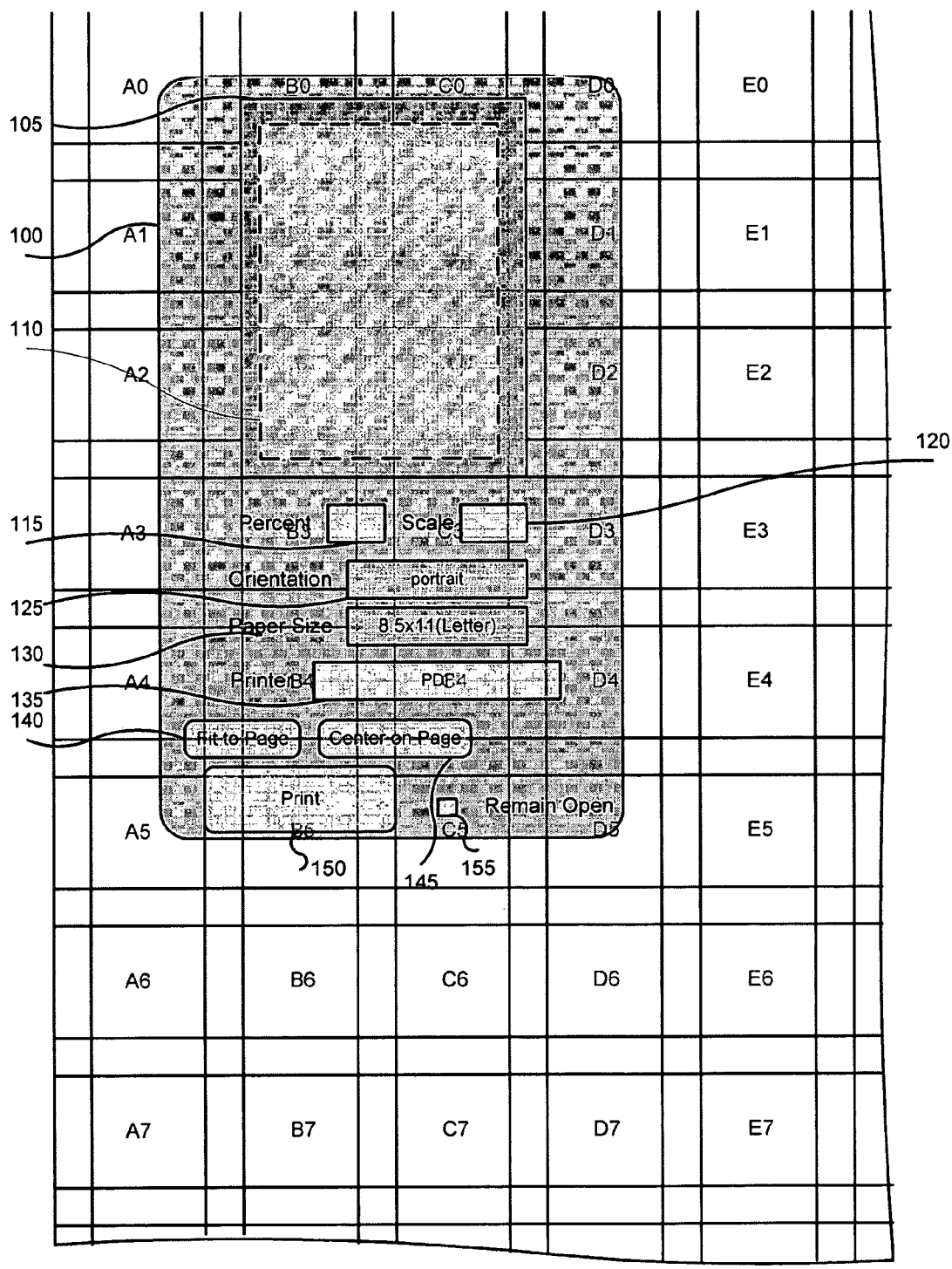
FIG. 2D illustrates the exemplary print page user interface with portrait orientation selected.

FIG. 2D illustrates the exemplary print page user interface with portrait orientation selected. In some embodiments, printing margins 110 may change shape when orientation 125 is changed. Here, the change in orientation from landscape to portrait changes the shape or aspect ratio of printing margins 110. Instead of being more wide than long, printing margins 110 may be more long than wide. In some embodiments, the controls or buttons and information included in the printing interface (i.e., percent 115, scale 120, orientation 125, paper size 130, printer 135, fit to page 140, center on page 145, print button 150 and remain open 155) do not reduce in size upon a reduction in size of printing interface 100. In some embodiments, the controls and information are repositioned upon a change in size of printing interface 100. Here, the controls and information are repositioned upon the change in size of printing interface 100 based on the change in orientation 125.

Figure 2E:
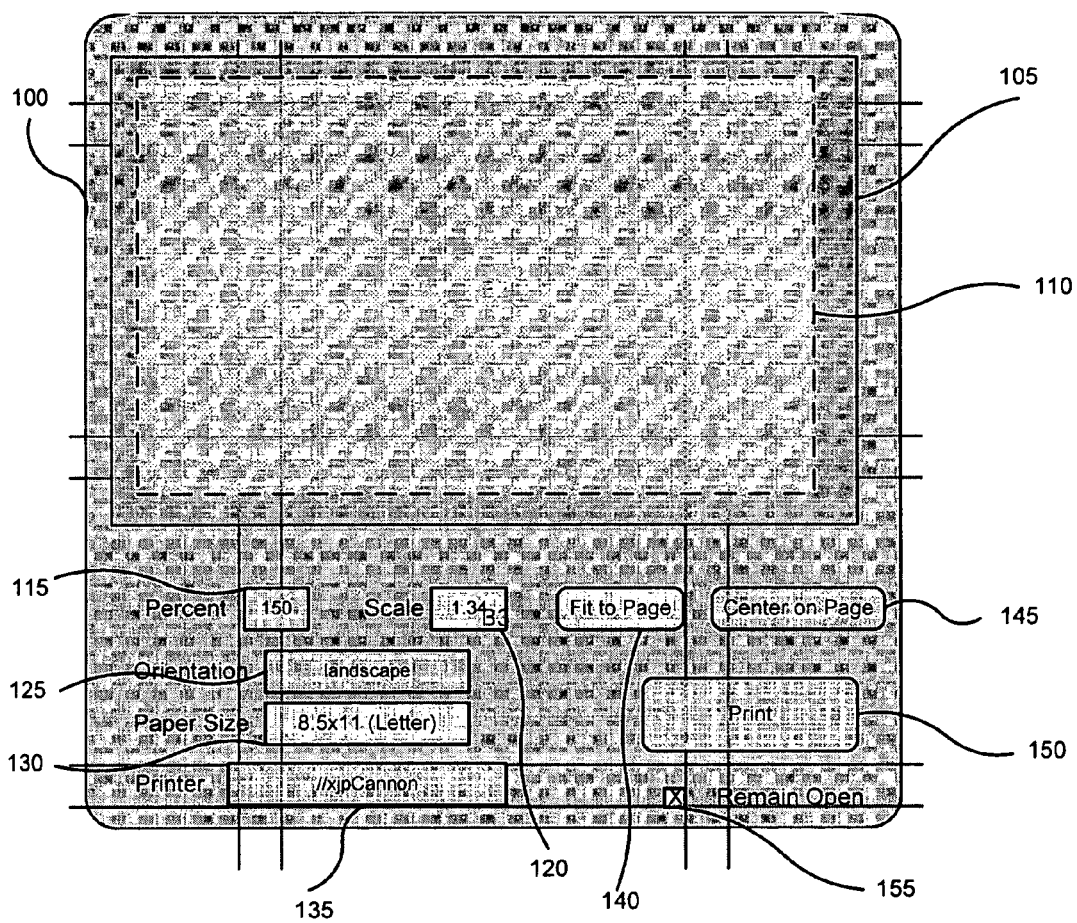
FIG. 2E illustrates the exemplary print page user interface with magnification settings.

FIG. 2E illustrates the exemplary print page user interface with magnification settings. In some embodiments, magnification may be used to obtain the desired printout. Magnification may be accomplished by magnifying or "zooming in" on the content or by utilizing the percent magnification 115 and/or scale 120. Here, percent magnification 115 and scale 120 are calculated to reflect the magnification of the content. Here, printing margins 110 shows an enlarged view of portions of content sectors B1-B3.

Figure 3A:
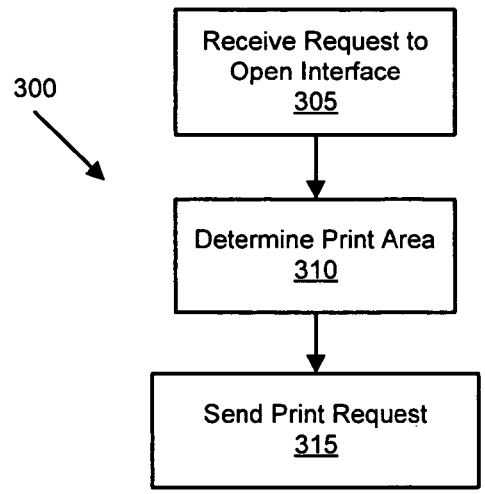
FIG. 3A illustrates an exemplary process for printing.

FIG. 3A illustrates an exemplary process for printing, 300. In some embodiments, printing may include receiving a request to open an interface 305, determining a print area 310, and sending a print request 315. In process action 305 a request may be received to open the printing interface. In some embodiments, a request may be a message, command, or other input (e.g., user, system, default-specified, or other) that, when received, initiates or triggers a responsive action, message, command, action, or data to be sent. Here, a request may include selection of a print menu item or button. Selection may occur from one of several input devices such as keyboard, mouse, touch pad, roller ball, or the like. The printing interface may be opened and/or positioned on top of content. Content may include large format drawings, electronic documents, electronic spread sheets, electronic charts, electronic graphics, electronic drawings, electronic images or other electronic content. The printing interface may be transparent, or see through, such that the content positioned underneath the printing interface is visible. In other words, the printing interface and the content positioned underneath the printing interface may be visible simultaneously. In process action 310 the print area may be determined. The print area may be the portion of content identified for printing. The print area may be determined by the print zone. The print zone may be an area of the printing interface that separates the content that is to be printed from the content that is not. The content visible in the print zone may be identified for printing. The print zone may be referred to as printing zone, printing margins, imagable area, printing area, printing region, or similar terms. The print zone may be manipulated by further requests. In some embodiments, the print zone size may be modified. In some embodiments the print zone shape may be modified. In some embodiments, the print zone position may be modified. In some embodiments, the print zone may identify the portion of content that may fit on a single sheet of paper. In some embodiments, selecting a paper size for the printout affects the print zone size or shape, and thus affects the determination of print area. In process action 315 a print request for the print area may be sent. The print request may include magnification or scaling information, paper size, printing orientation, content and other printing details. In some embodiments, the sending of the print request does not close the printing interface.

Figure 3B:
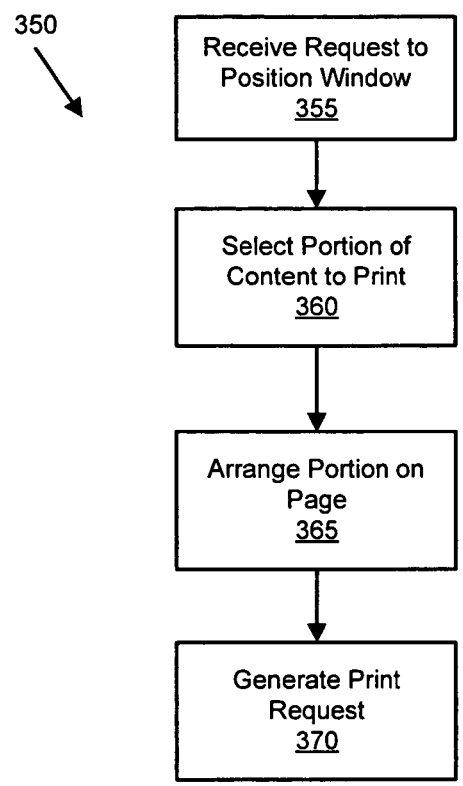
FIG. 3B illustrates an exemplary process for printing.

FIG. 3B illustrates an exemplary process for printing, 350. In some embodiments, printing may include receiving a request to position a window 355, selecting a portion of content to print 360, arranging the portion on a page 365, and generating a print request 370. In process action 355 a request may be received to position the printing interface. In some embodiments, a request may be a message, command, or other input (e.g., user, system, default-specified, or other) that, when received, initiates or triggers a responsive action, message, command, action, or data to be sent. Here, a request may include selecting the printing interface or window and dragging it across the screen with in input device such as a mouse, roller ball, keyboard, touch pad or the like. The request may include positioning the content as well. The content may be positioned in the visible screen space. The printing interface or window may be positioned over the portion of content it is desired to print. In process action 360 the portion of content to print may be selected. The content that is contained in, is visible in, or appears within the boundaries of the print zone may be printed. In some embodiments, selecting the portion of content may include sizing the print zone. Sizing the print zone may include receiving a request for a paper size. The paper size may affect the size of the print zone, and thus may affect the portion of content selected. The size of the printing interface may be manipulated by selecting the corner of the printing interface and dragging toward the interface (for reduction in size) or dragging away from the interface (for enlargement in size). In process action 365, the portion may be arranged on the page. In some embodiments, arranging the portion on the page may include determining page orientation. That is, if the page orientation is landscape the content may be arranged with the width being longer than the length. If the page orientation is portrait, the portion may be arranged with the length being longer than the width. In some embodiments, arranging the portion on the page may include magnification. That is, if it is determined that the magnification for the portion is greater than 100, the portion may be enlarged in scale. If it is determined that the magnification for the portion is less than 100, the portion may be reduced in scale. In some embodiments, magnification may include sizing the printing interface as described above. In process action 370, the print request may be generated such that the appropriate portion of content arranged as desired may be printed. In some embodiments, the print request may not exceed one sheet of paper.

Figure 4:
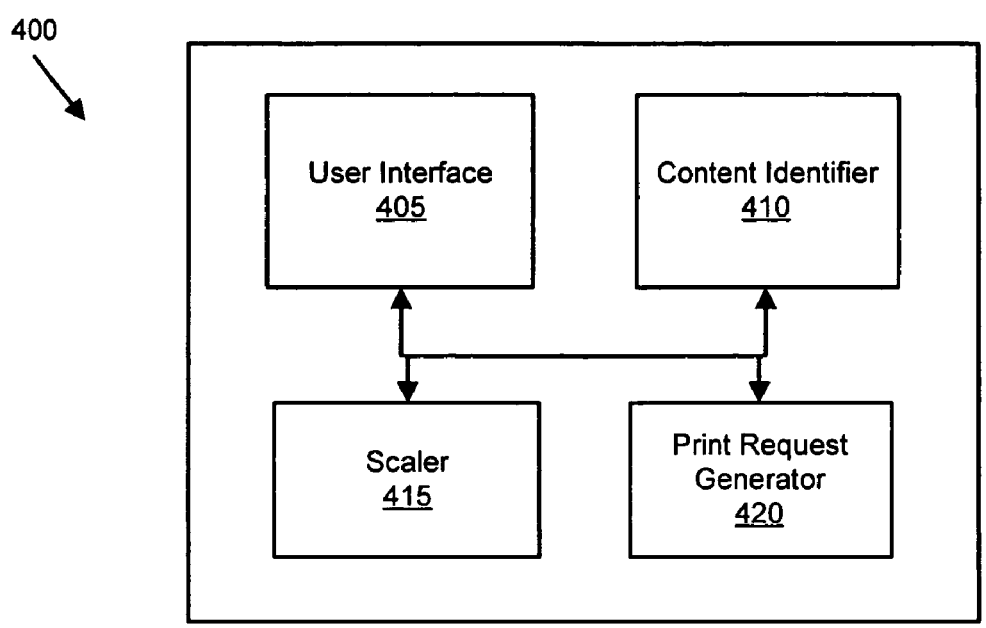
FIG. 4 illustrates an exemplary system for a print page user interface.

FIG. 4 illustrates an exemplary system for a print page user interface, 400. In some embodiments a system for printing may include a user interface 405, a content identifier 410, a scaler 415, and a print request generator 420. In some embodiments, the scaler may not be included. User interface 405 may be an active window in an application, a dialog box, or other similar interface. User interface 405 may include user controls and edit elements such as buttons, selection windows, radio buttons, check boxes, edit boxes, slider bars, and other means of interacting with a user. User interface 405 may be part of a computer application that provides printing capability. User interface 405 may be transparent such that when placed on top of content in an application, the user interface and the content underneath may be simultaneously visible. User interface 405 may accept one or more inputs from a user to select various printing features. For example, a user interface 405 may accept an input to keep the printing interface open after a print is complete. Content identifier 410 may identify the portion of content to print. Content identifier may include a printing zone or printing region in the user interface. The printing zone may provide a visual indication as to the portion of content to be printed. That is, the portion of content visible in the print zone of user interface 405 as user interface 405 lies on top of the content may be selected for printing. Content identifier 410 may include a user interface positioner, such that the user interface may be positioned over differing portions of content. Positioning may include moving the user interface. Positioning may include moving the place of the content. For example, the content may be scrolled one way or another to display another portion of content. Content identifier 410 may include a user interface sizer and shaper such that the size and shape of the user interface may be altered. Altering the user interface may include altering the print zone, and thus altering the quantity or portion of content identified for printing. A user interface sizer may change the size of the user interface based on settings or based on the dragging of the printing interfaced application window. A user interface shaper may change the shape of the user interface based on settings. Settings may include paper size, orientation, magnification, scale and/or similar printing parameters. Scaler 415 may include a content magnifier. A content magnifier may enlarge or reduce the scale of the portion of content to be printed. Scaler 415 may be based on settings or based on calculations. That is, in some embodiments, a user may input the value of scaler 415. In some embodiments, a user may select the paper size and print area; and the scaler may calculate the enlargement or reduction of the portion of content to fit on the paper size selected. For example, if a user zoomed out on the content so that a large amount of content is visible in the print zone; scaler 415 may have to reduce the scale or magnification of the amount of content to arrange the content on the printed paper. Zoom level may be referred to as a magnified view. That is, the zoom level may determine the quantity and size of the content as it is displayed. At a high zoom level the content may appear large and sparse in an application window or similar display area. At a low zoom level the content may appear small and dense in the application window or similar display area. Print request generator 420 may generate a print request to allow the portion of content that appears in the print zone to be printed on the selected size of paper. Print request generator 420 may generate requests including the portion of content, the size of paper, the orientation of the printing, the magnification of the printing of the portion of content, and other similar printing information.

Figure 5:
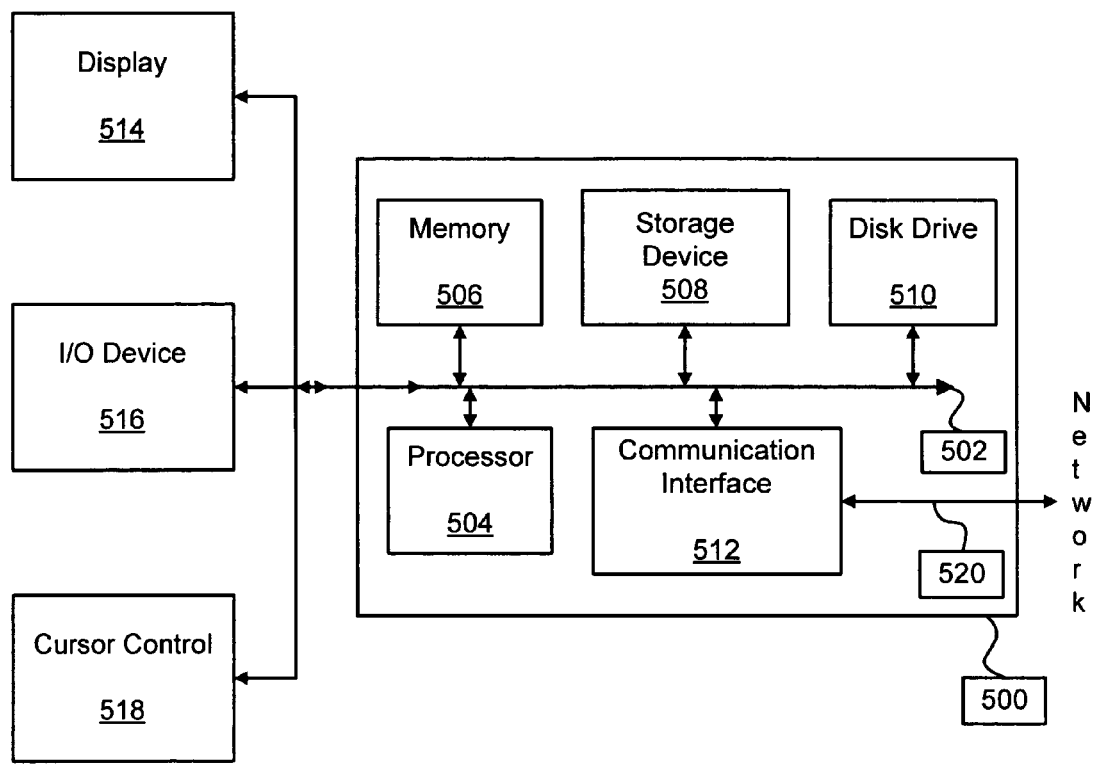
FIG. 5 is a block diagram illustrating an exemplary computer system suitable for a print page user interface.

FIG. 5 is a block diagram illustrating an exemplary computer system suitable for window layout optimization, in accordance with an embodiment. In some embodiments, computer system 500 may be used to implement computer programs, applications, methods, or other software to perform the above-described techniques for fabricating storage systems such as those described above. Computer system 500 includes a bus 502 or other communication mechanism for communicating information, which interconnects subsystems and devices, such as processor 504, system memory 506 (e.g., RAM), storage device 508 (e.g., ROM), disk drive 510 (e.g., magnetic or optical), communication interface 512 (e.g., modem or Ethernet card), display 514 (e.g., CRT or LCD), input device 516 (e.g., keyboard), and cursor control 518 (e.g., mouse or trackball).

According to some embodiments of the invention, computer system 500 performs specific operations by processor 504 executing one or more sequences of one or more instructions stored in system memory 506. Such instructions may be read into system memory 506 from another computer readable medium, such as static storage device 508 or disk drive 510. In some embodiments, hard-wired circuitry may be used in place of or in combination with software instructions to implement the invention.

The term "computer readable medium" refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some embodiments of the invention, execution of the sequences of instructions to practice the invention is performed by a single computer system 500. According to some embodiments of the invention, two or more computer systems 500 coupled by communication link 520 (e.g., LAN, PSTN, or wireless network) may perform the sequence of instructions to practice the invention in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

Although the foregoing embodiments have been described in some detail for purposes of clarity of understanding, implementations of the above-described system and techniques is not limited to the details provided. There are many alternative implementations and the disclosed embodiments are illustrative and not restrictive.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
    displaying a document comprising content;
    receiving a request to open a printing interface, wherein the printing interface is substantially transparent such that content positioned underneath the printing interface is visible, wherein the printing interface comprises a print zone, wherein the size of the print zone is dependent on current printing settings for printing to a printer, wherein the current printing settings include one or more of paper size, print margins, zoom, scale, or orientation, and wherein the print zone is usable to select content to be printed on a single page based on the current printing settings;
    in response to user input, positioning the printing interface to determine a print area, the print area comprising the portion of the content visible in the print zone;
    wherein the print area is the portion of the content that will print on no more than one sheet of paper at the current printing, settings, wherein the print area is less than all the content displayed; and
    sending a request to print the print area on the no more than one sheet of paper.

2. The method of claim 1, wherein the printing settings comprise the paper size for a printout.

3. The method of claim 1, wherein the printing settings comprise the orientation for a printout.

4. The method of claim 1, wherein the printing settings comprise a scaling factor for the scale for a printout, the scaling factor altering the magnification of the print area when printed.

5. The method of claim 1, comprising repositioning the printing interface relative to a position of the content.

6. The method of claim 1, further comprising altering a magnification of the content, wherein said altering changes an amount of the content in the print zone.

7. The method of claim 1, wherein determining the print area further comprises simultaneously determining another portion of content outside the print zone that is excluded from the print request.

8. The method of claim 1, wherein sending a request to print the print area further comprises sending a request to create an electronic document.

9. A non-transitory computer readable medium storing instructions computer executable to implement:
    displaying a document comprising content;
    receiving a request to open a printing interface, wherein the printing interface is substantially transparent such that content positioned underneath the printing interface is visible, wherein the printing interface comprises a print zone, wherein the size of the print zone is dependent on current printing settings for printing to a printer, wherein the current printing setting include one or more of paper size, print margins, zoom scale, or orientation, and wherein the print zone is usable to select content to be printed on a single page based on the current printing settings;

in response to user input, positioning the printing interface to determine a print area, the print area comprising the portion of the content visible in the print zone;

wherein the print area is the portion of the content that will print on no more than one sheet of paper at the current minting settings, wherein the print area is less than all the content displayed; and sending a request to print the print area on the no more than one sheet of paper.

10. A printing interface, comprising:

a processor;

a memory comprising program instructions, wherein the program instructions are executable by the processor to generate:

a user interface configured to be substantially transparent such that content positioned substantially under the user interface is visible, wherein the user interface comprises controls for printing settings and a printing boundary, wherein the size of the printing boundary is dependent on current printing settings for printing to a printer, wherein the current printing settings include one or more of paper size, print margins, zoom, scale, or orientation, and wherein the user interface may be positioned in response to user input;

a content identifier configured to identify a portion of content that appears in the printing boundary to fit an no mom than one sheet of paper, wherein the size of the content identifier is dependent on current printing settings;

a scaler configured to determine a magnification of the portion based on a paper size and a zoom level; and a print command generator configured to generate one or more printing instructions to print the portion of content that appears in the printing boundary based on the magnification.

11. The printing interface of claim 10, wherein the scaler is further configured to alter the magnification of the content.

12. The printing interface of claim 10, wherein the size of the printing boundary is based on the paper size.

13. The printing interface of claim 10, wherein the content identifier changes a size of the printing boundary based on a change in size of the user interface.

14. The printing interface of claim 13, wherein an aspect ratio of the printing boundary is maintained through the change in size of the user interface.

15. The printing interface of claim 10, wherein the size of the printing boundary is based on the orientation of a printout.

16. The printing interface of claim 10, wherein the printing interface is further configured to remain open after the print command generator sends the printing instructions.

17. A printing interface, comprising:

a processor;

a memory comprising program instructions, wherein the program instructions are executable by the processor to generate:

a dialog box configured to be substantially transparent such that when positioned on top of an electronic document the electronic document is visible through the dialog box, the dialog box comprising:

a printing field, the printing field being an area of the dialog box configured to identify a portion of the electronic document that can be printed using no more than one sheet of paper using current printing settings for printing to a printer, wherein the current printing settings include one or more of paper size, print margins, zoom, scale, or orientation, wherein the size of the printing field is dependent on current printing settings, and wherein said identifying a portion of the electronic document comprises positioning the printing field in response to user input such that the portion of the electronic document is visible through the printing field;

a paper size control configured to determine a size for the single sheet of paper on which to print the portion of the electronic document visible in the print field;

a scale control configured to determine a scale for the portion of the electronic document when printed;

an orientation control configured to determine an orientation for the portion of the electronic document on the single sheet of paper; and a print control configured to transmit a print command.

18. The printing interface of claim 17, wherein the dialog box comprises no more than one dialog box.

19. The printing interface of claim 17 wherein the dialog box is configured to remain open after the print command is transmitted.

20. The printing interface of claim 17, wherein the dialog box further comprises printer status information.

* * * * *